(12) United States Patent
Beranger et al.

(10) Patent No.: US 6,641,001 B2
(45) Date of Patent: Nov. 4, 2003

(54) FIXING DEVICE FOR FIXING A DISPENSING MEMBER TO THE NECK OF A RECEPTACLE

(75) Inventors: Stéphane Beranger, Le Neubourg (FR); Firmin Garcia, Evreux (FR)

(73) Assignee: Valois S.A., Le Neubourg (FR)

( * ) Notice: Subject to any disclaimer, the term of this patent is extended or adjusted under 35 U.S.C. 154(b) by 50 days.

(21) Appl. No.: 10/015,694

(22) Filed: Dec. 17, 2001

(65) Prior Publication Data

US 2002/0076271 A1 Jun. 20, 2002

(30) Foreign Application Priority Data

Dec. 20, 2000 (FR) .............................. 00 16700

(51) Int. Cl.⁷ ................................................ G01F 11/42
(52) U.S. Cl. ........................ 222/321.9; 222/321.7; 222/385; 222/402.1; 222/570; 220/806; 220/803
(58) Field of Search ................... 222/321.9, 321.6, 222/321.7, 321.1, 321.2, 321.8, 385, 380, 570, 574, 634, 402.1; 220/806, 803, 795, 378; 215/352, 274, 276

(56) References Cited

U.S. PATENT DOCUMENTS

| | | | | |
|---|---|---|---|---|
| 3,923,250 A | * | 12/1975 | Boris | 239/321 |
| 4,173,297 A | * | 11/1979 | Pettersen | 222/321.2 |
| 4,693,675 A | * | 9/1987 | Venus, Jr. | 417/489 |
| 4,773,553 A | * | 9/1988 | Van Brocklin | 215/272 |
| 4,984,702 A | * | 1/1991 | Pierpont | 215/272 |
| 5,069,369 A | * | 12/1991 | McGarvey | 222/321.9 |
| 5,108,013 A | * | 4/1992 | VanBrocklin | 222/321.9 |
| 5,192,006 A | * | 3/1993 | Van Brocklin et al. | 222/321.9 |
| 5,234,135 A | * | 8/1993 | LaFosse et al. | 222/321.2 |
| 5,642,908 A | * | 7/1997 | Mascitelli | 285/148.19 |
| 5,918,778 A | * | 7/1999 | Schultz | 222/321.7 |
| 6,273,303 B1 | * | 8/2001 | de Pous et al. | 222/402.1 |
| 6,364,181 B1 | * | 4/2002 | Garcia et al. | 222/634 |
| 6,409,049 B1 | * | 6/2002 | de Pous et al. | 222/153.09 |

* cited by examiner

Primary Examiner—Gene Mancene
Assistant Examiner—Frederick C Nicolas
(74) Attorney, Agent, or Firm—Sughrue Mion, PLLC

(57) ABSTRACT

A fixing device for fixing a dispensing member to the neck of a receptacle, the fixing device includes a fixing ring having a bottom skirt engaging a neck of a receptacle, a member for receiving a dispensing member, and a top socket which extends in the direction opposite to the direction in which the skirt extends; and trim which extends around the ring so as to mask it at least in part, the trim having a body defining a top end forming an inwardly-extending rim that extends inwards and then downwards so as to define an inner sleeve. The sleeve comes into engagement with the inside surface of the socket; and the inner sleeve forms a resilient tab which extends outwards and upwards so as to define a free end which comes into contact with an inside surface of the socket.

8 Claims, 2 Drawing Sheets

FIXING DEVICE FOR FIXING A DISPENSING MEMBER TO THE NECK OF A RECEPTACLE

The present invention relates to a fixing device making it possible to fix a dispensing member such as a pump or a valve to the neck of a receptacle. This type of device is in frequent use in the fields of perfumes, cosmetics, or indeed pharmaceuticals, for fixing a pump or a valve to the neck of a receptacle forming a reservoir in which the fluid to be dispensed is stored.

BACKGROUND OF THE INVENTION

In general, this type of fixing device comprises a fixing ring and trim which extends around the ring so as to mask it at least in part. The trim has an aesthetic appearance function, but it can also perform a technical function in co-operation with the fixing ring. Usually, the trim is made of metal for reasons purely of aesthetic appearance. However, the trim can also be made of a plastics material.

Conventionally, the fixing ring includes a bottom skirt serving to come into engagement with the neck of the receptacle. The bottom skirt can extend inside the neck, but in general it extends around the neck. A variety of techniques are used for fixing the skirt into or onto the neck. For example, when the skirt extends around the neck, it is possible for the neck to form one or more inside snap-fastening profiles serving to come into engagement under a reinforced portion or "lip" formed by the neck. The skirt can be in the form of a continuous cylinder, or else it may have flexible tabs extending side-by-side around the periphery of the skirt. The trim can then serve as locking means for holding the tabs in engagement under the lip. When the skirt extends inside the neck, said skirt can, for example, be provided with an outside snap-fastening bead serving to come into engagement in a recess formed inside the neck.

In addition to the bottom skirt, the fixing ring is in general provided with member-receiving means for receiving a dispensing member such as a pump or a valve. In general, the member-receiving means are in the form of a snap-fastening recess in which the top end of the body of the pump or of the valve is received by snap-fastening. Naturally, it is possible to consider other techniques for fixing the dispensing member to the fixing ring.

Finally, in general, the fixing ring is provided with a top socket which extends in a direction opposite to the direction in which the skirt extends, i.e. the free ends of the skirt and of the socket extend in opposite directions. When the skirt extends around the neck, the top socket may be situated substantially in alignment with the skirt. When the skirt extends inside the neck, the top socket has a diameter greater than the diameter of the skirt, and advantageously greater than the diameter of the neck.

The trim, which is in general made of metal, comprises a body which extends around the fixing ring, in general around the socket and at least a portion of the bottom skirt. The body of the trim is in general cylindrical, but it may also have other forms, e.g. it may be bullet shaped. The body of the trim is not necessarily in contact with the fixing ring.

At the top end of the body, the trim also forms an inwardly-extending rim which extends inwards and then downwards to define a substantially cylindrical inner sleeve. The inner sleeve extends substantially concentrically with the body of the trim.

It is already known from the prior art that the inner sleeve can be used to come into engagement with the inside surface of the top socket formed by the fixing ring.

Such a fixing device is described, in particular, in Document FR 2 776 989. The trim in that document includes a rim and an inner sleeve whose bottom end is provided with teeth adapted to bite into the top socket. This makes it possible to prevent the trim securely from rotating on the ring. However, in order to ensure that the trim is fixed properly to the ring, the trim is further provided with bottom retaining means which co-operate with the fixing ring. In other words, the toothed inner sleeve of that trim does not, on its own, make it possible to fix the trim reliably on the fixing ring.

OBJECTS AND SUMMARY OF THE INVENTION

An object of the present invention is to remedy the above-mentioned drawbacks of the prior art by defining a fixing device for fixing a dispensing member, in which device the trim includes an inner sleeve which, on its own, fixes properly and reliably to the fixing ring. Another additional object is to obtain such reliable fixing without implementing material-deforming methods such as crimping. It is relatively difficult technically to perform crimping at the sleeve. Another object of the invention is to provide reliable fixing at the sleeve merely by putting the trim in place on the socket of the fixing ring.

To achieve these objects, the present invention provides that the inner sleeve forms at least one resilient tab which extends outwards and upwards so as to define a free end which comes into contact with the inside surface of the socket. Since the resilient tab extends outwards, it has to come into contact with the inside surface of the socket via its free end. In addition, because the resilient tab extends upwards, it extends in sloping manner, with its free end forming its top end. Therefore, once they are engaged in the socket of the fixing ring, the free ends of the tabs are pressed into contact with the inside surface of the socket, and they thus oppose removal of the trim by acting as barbs. The more the trim is pulled, the more the free ends of the tabs bite into the inside surface of the socket. It is thus totally impossible to remove the trim from the fixing ring. In addition, since the resilient tabs are, by definition, discrete and non-continuous elements, it is possible simultaneously to prevent the trim from rotating on the fixing ring. The corners of all of the free ends of the tabs bite into the inside surface of the socket and thus act as rotation-prevention corners. Therefore, the resilient tabs that project outwards and upwards are sufficient in themselves to fix the trim properly to the fixing ring.

According to an advantageous characteristic of the invention, the socket forms an inwardly-projecting shoulder below which the free end of the tab is received. Since the tab is resilient, it can engage the shoulder when the trim is put in place on the fixing ring, and it then extends in its natural position outwards and upwards under the shoulder which thus forms an abutment surface permanently preventing the trim from being removed. In a variant, the shoulder may also be in the form of a groove in which the free end of the tab comes to be received when the trim is in its final position on the fixing ring. What is essential is that the free end of the tab comes into abutment against an abutment surface that permanently prevents the trim from being removed from the fixing ring.

In a practical embodiment, the trim may be provided with at least three resilient tabs distributed circumferentially.

According to another characteristic of the invention, the tab may be formed by a cutout in the sleeve. For example, the cutout may be in the form of an upside down U, inside which the tab is defined. When the trim is manufactured, the resulting tab(s) is/are folded outwards so as to extend finally out of the cutout and upwards. It should be noted that, with such trim, it is not necessary to provide any fixing operation for fixing the trim to the fixing ring, since the fixing takes place automatically on putting the trim in place on the fixing ring.

According to another characteristic of the invention, the inwardly-extending rim and the sleeve form an annular recess in which the socket is engaged via its free top end, the body of the trim being spaced apart from the socket at the free top end. Since the top end of the body is thus free, the inwardly-extending rim and the inner sleeve offer high elastic deformation capacity, which facilitates putting the trim in place on the fixing ring. During this assembly operation, the resilient tabs must be deformed to pass over the shoulder under which they can then be deployed freely again, thereby permanently fixing the trim to the fixing ring.

BRIEF DESCRIPTION OF THE DRAWINGS

The invention is described more fully below with reference to the accompanying drawings giving an embodiment of the invention by way of non-limiting example.

MORE DETAILED DESCRIPTION

Figure 1:
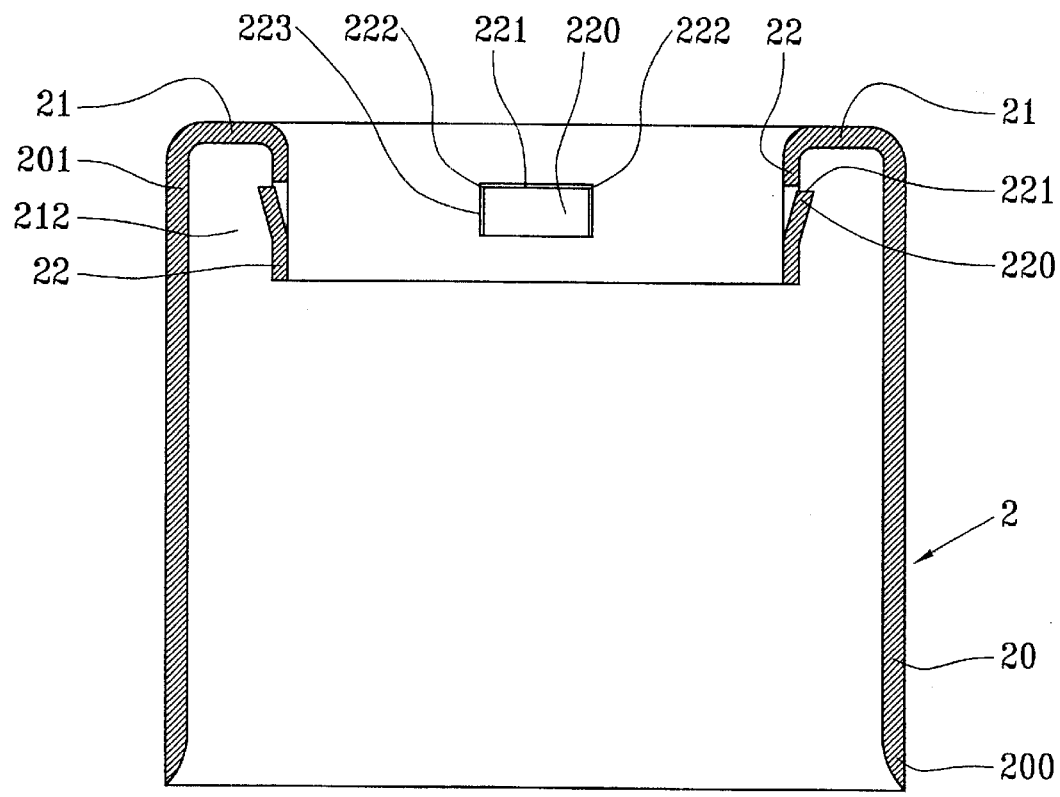
FIG. 1 is an exploded section view through a fixing device of the invention, with the trim disposed above the fixing ring and ready to be mounted thereon.
Figure 1:
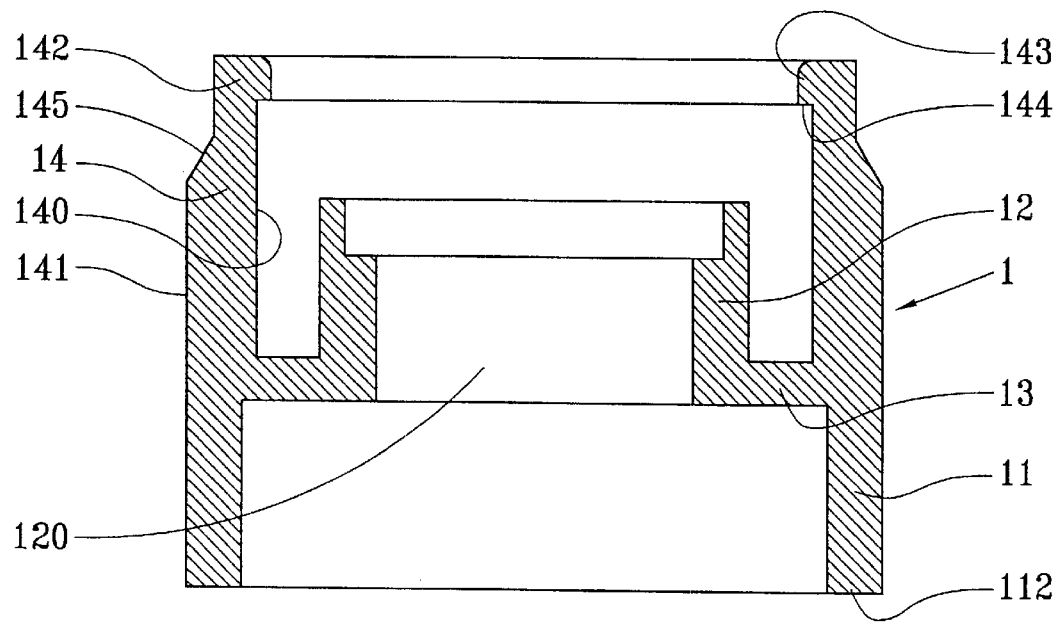

The fixing device of the invention essentially comprises two component parts, namely a fixing ring designated by overall numerical reference 1, and trim designated by overall numerical reference 2. These two elements are clearly visible in separate manner in FIG. 1.

The fixing ring 1 comprises a bottom skirt 11, member-receiving means 12, a link web 13 connecting the skirt 11 to the member-receiving means 12, and a top socket 14. The bottom end 112 of the bottom skirt 11 is a free end, while its top end is connected to the link web 13, and to the top socket 14. In this example, the bottom skirt 11 serves to co-operate with the neck of a receptacle (not shown). The bottom skirt 11 fixes the ring 1 to the neck of the receptacle. The specific fixing means making it possible to engage the ring on the neck are not shown in FIG. 1, since they are not essential for the present invention. As mentioned above, the bottom skirt 11 may be formed with various profiles making it possible to co-operate effectively with a receptacle neck. For example, the skirt may form an inside bead or else flexible tabs that can come to be received around a thickened reinforcement formed conventionally by a receptacle neck.

The link web 13 extends annularly inwards and is connected over its inside periphery to the member-receiving means 12 which may be in the form of a sleeve, on or in which the dispensing member such as a pump or a valve can be received stably. The specific means making it possible to fix the dispensing member 3 in the member-receiving means are not shown either, since they are not essential to the present invention. For example, the member-receiving means may be in the form of a recess, inside which the pump or the valve is received in fixed manner by snap-fastening. The top socket 14 is connected via its bottom end to the skirt 11 and to the link web 13. The socket 14 defines an inside surface 140 and an outside surface 141. The socket 14 extends in the opposite direction away from the skirt 11 to define a free top end 142 which points in the direction opposite to the direction in which the free end 112 of the bottom skirt 11 points. In the embodiment shown, the skirt 11 and the socket 14 extend substantially in mutual alignment to define a common cylindrical outside surface. This does not apply when the fixing ring is a fixing ring in which the bottom skirt is adapted to come into engagement inside the neck of the receptacle. In which case, the skirt 11 extends in alignment with the member-receiving means 12.

According to a characteristic of the invention, the inside surface 140 of the socket 14 forms a shoulder 143 which projects inwards. The shoulder 143 forms a bottom abutment surface 144. In place of the shoulder 143, it is also possible to provide an annular groove formed in the inside surface 140 which can then remain exactly cylindrical except at the place where the groove is provided. The top wall of the groove then serves as an abutment like the abutment surface 143 formed by the shoulder 143.

Another characteristic of the invention makes provision for the outside surface 141 to form a bevel 145 at the top end of the socket 14.

Figure 2:
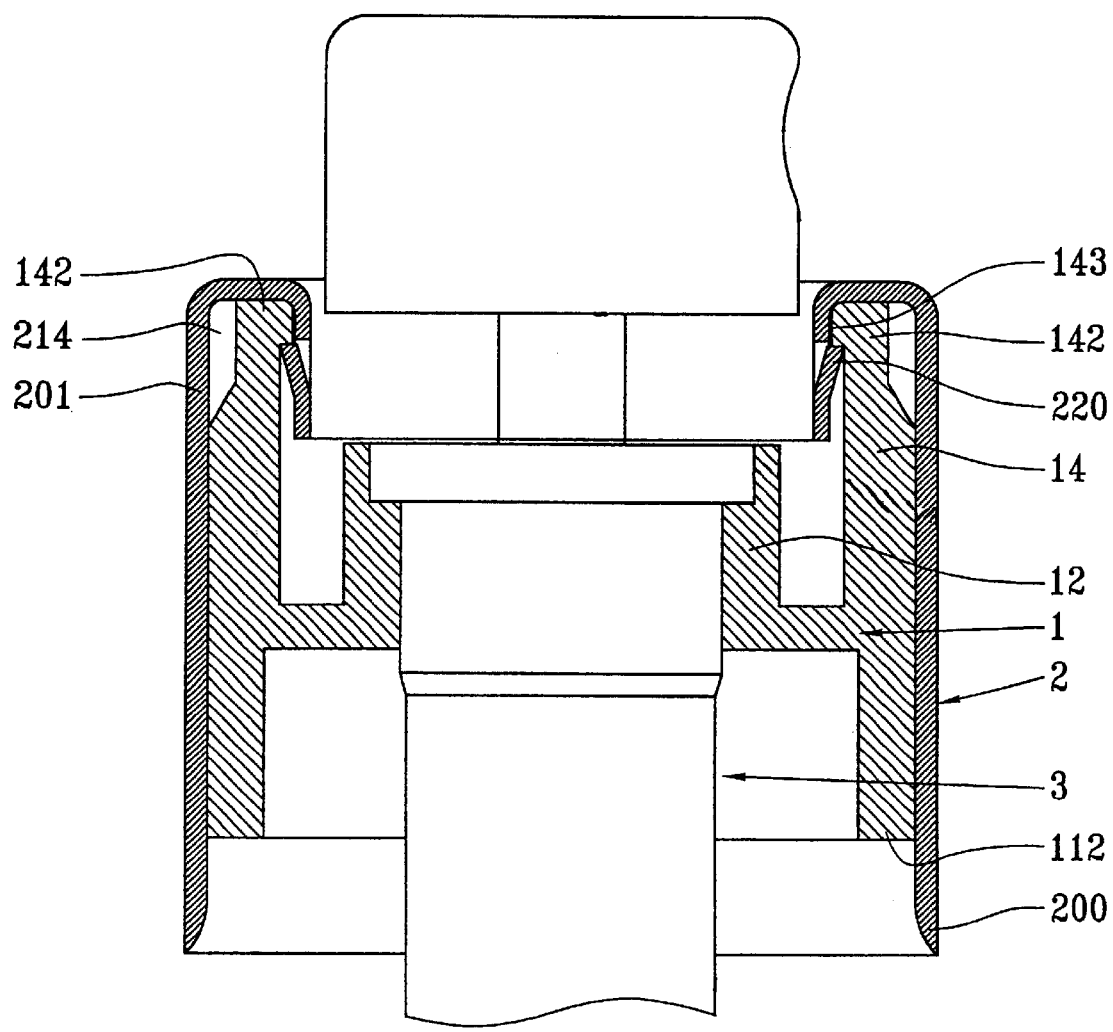
FIG. 2 is a vertical section view through the fixing device of FIG. 1, in the state in which it is assembled with a a dispensing member.
Figure 3:
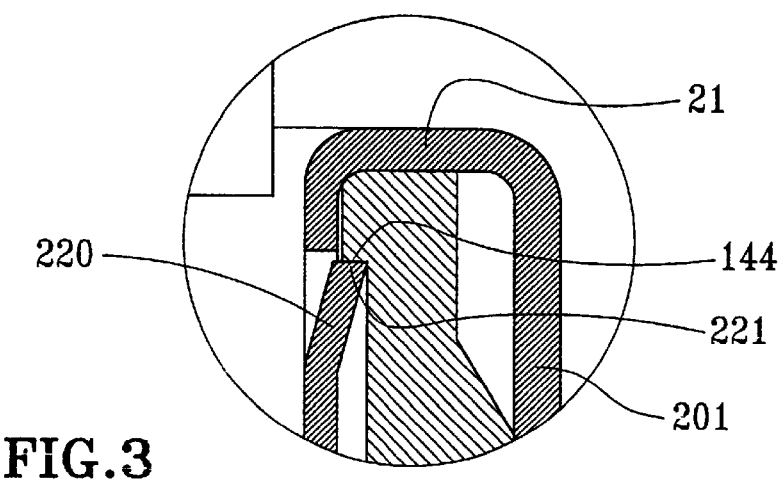
FIG. 3 is an enlarged view of a detail of FIG. 2.

The trim 2 comprises a body 20 which, in this example, is exactly cylindrical, but which could also have more complicated aesthetically-pleasing shapes, e.g. bullet-like shapes. The body 20 forms a free bottom end 200 and a top end 201 that is extended by an inwardly-extending rim 21. The inwardly-extending rim 21 is itself extended downwards by an inner sleeve 22 which extends substantially concentrically with the body 20. The free end of the sleeve 22 points in the same direction as the free end 200 of the body 20. The top end 201 of the body 20, the inwardly-extending rim 21 and the inner sleeve 22 together form an annular recess 212 serving to receive the free end 142 of the socket 14, as can be seen in FIG. 2. In this embodiment, the inside surface of the body 20 of the trim 2 comes into contact with the fixing ring 1, and more precisely at the socket 14 and at the bottom skirt 11. It can be noted that the body 20 of the trim 2 masks all of the fixing ring, since its free end 200 extends below the free end 112 of the skirt 11. However, it can be observed that the top end of the body 20 of the trim 2 is not in contact with the top end 142 of the socket 14 since its outside wall 141 forms the bevel 145. An empty space 214 is thus provided between the free end 201 and the outside wall 141. The empty space 214 imparts a certain amount of resilience at this level, which resilience has repercussions on the inwardly-extending rim 21 and on the inner sleeve 22 which can thus move to a certain extent without being subjected to deformation. The bevel 145 also makes it possible to facilitate engaging the trim over the socket of the ring.

According to the invention, the inner sleeve 22 is provided with at least one flexible tab 220, and preferably with a plurality of flexible tabs 220, e.g. four such tabs, as shown in FIG. 1, distributed uniformly around the periphery of the inner sleeve 22. Each of the flexible tabs 220 are formed by providing a cutout 223 in the sleeve 22. The cutout is advantageously in the form of an upside down U, inside which the flexible tab 220 is formed. According to an advantageous characteristic of the invention, the flexible tabs 220 slope outwards and upwards. More precisely, the bottom ends of the flexible tabs are connected to the sleeve 22 while their free ends 220 point outwards and upwards. The tabs are flexible or resilient so that they can be returned resiliently into the cutout 223 SO as to form an exact cylinder again. As soon as the stress is released, the resilient tabs take up their natural rest position again, in which they slope outwards and upwards.

According to the invention, the flexible tabs 220 co-operate with the inside surface 140 of the socket 14. More precisely, the flexible tabs 220 come into contact with the inside wall 140 via their free ends 221 so as to perform a barb function, preventing the trim from being removed once it is mounted on the fixing ring. The free ends 221 of the tabs 220 may merely bite into the material of the socket 14, in barb-like manner, but preferably, the free ends 221 of the flexible tabs 220 co-operate with the abutment surface 144 formed by the shoulder 143 situated at the top end 142 of the socket 14. By coming to be received under said shoulder 143, the tabs are snap-fastened permanently and the trim can no longer be removed from the fixing ring. Such a permanent snap-fastening function may also be provided by means of a groove provided in the inside surface 140 of the socket 14, and in which the free ends 221 of the tabs can be snap-fastened.

In addition, since the tabs 220 have sharp corners 222, said corners participate in preventing the trim from rotating by also acting as barbs. Permanent fixing, both in translation and in rotation, is thus achieved.

What is claimed is:

1. A fixing device for fixing a dispensing member to the neck of a receptacle, said fixing device comprising:

a fixing ring comprising a bottom skirt serving to come into engagement with a neck of the receptacle, member-receiving means for receiving a dispensing member such as a pump or a valve, and a top socket which extends in the direction opposite to the direction in which the skirt extends, said socket defining an outside surface and an inside surface; and trim which extends around the ring so as to mask it at least in part, the trim comprising a body defining a top end forming an inwardly-extending rim that extends inwards and then downwards so as to define a substantially cylindrical inner sleeve, said sleeve coming into engagement with the inside surface of the socket;

wherein the inner sleeve forms at least one resilient tab which extends outwards and upwards so as to define a free end which comes into contact with the inside surface of the socket.

2. A device according to claim 1, in which the free end of the resilient tab bites into the socket.

3. A device according to claim 1, in which the socket forms an inwardly-projecting shoulder under which the free end of the tab is received.

4. A device according to claim 1, including at least three resilient tabs distributed circumferentially.

5. A device according to claim 1, in which the tab is formed by a cutout in the sleeve.

6. A device according to claim 1, in which the inwardly-extending rim and the sleeve form an annular recess in which the socket is engaged via its free top end, the body of the trim being spaced apart from the socket at the free top end.

7. A device according to claim 1, in which the free ends of the tabs form rotation-preventing corners preventing the trim from rotating on the fixing ring.

8. A device according to claim 1, in which the socket forms a bevel serving to facilitate engaging the trim on the ring.

* * * * *